US009660799B1

(12) United States Patent
Gendler et al.

(10) Patent No.: US 9,660,799 B1
(45) Date of Patent: May 23, 2017

(54) CHANGING THE CLOCK FREQUENCY OF A COMPUTING DEVICE

(71) Applicant: Intel Corporation, Santa Clara, CA (US)

(72) Inventors: Alexander Gendler, Kiriat Motzkin (IL); Ernest Knoll, Haifa (IL); Ofer Nathan, Kiryat Yam (IL); Michael Mishaeli, Zichron Yaakov (IL); Krishnakanth V. Sistla, Beaverton, OR (US); Ariel Sabba, Karmiel (IL); Shani Rehana, Shoham (IL); Ariel Szapiro, Tel Aviv (IL); Tsvika Kurts, Haifa (IL); Ofer Levy, Atlit (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/950,319

(22) Filed: Nov. 24, 2015

(51) Int. Cl.
*G06F 1/06* (2006.01)
*H04L 7/033* (2006.01)
*H04L 7/00* (2006.01)

(52) U.S. Cl.
CPC ............ *H04L 7/0331* (2013.01); *H04L 7/005* (2013.01); *H04L 7/0025* (2013.01)

(58) Field of Classification Search
CPC ...... H04L 7/0331; H04L 7/005; H04L 7/0025
See application file for complete search history.

(56) References Cited

U.S. PATENT DOCUMENTS

| 7,958,285 | B1 | 6/2011 | Chiu et al. | |
|---|---|---|---|---|
| 8,014,485 | B2 | 9/2011 | Kwan et al. | |
| 8,032,772 | B2 | 10/2011 | Allarey et al. | |
| 8,095,761 | B1 | 1/2012 | Schulze et al. | |
| 8,250,394 | B2 * | 8/2012 | Agrawal | G06F 1/3203 711/154 |
| 8,335,941 | B2 * | 12/2012 | Chang | G06F 1/3225 713/300 |
| 8,356,197 | B2 | 1/2013 | Allarey et al. | |
| 8,560,871 | B2 | 10/2013 | Allarey et al. | |
| 8,769,323 | B2 | 7/2014 | Allarey et al. | |
| 8,806,248 | B2 | 8/2014 | Allarey et al. | |
| 2006/0080566 | A1 * | 4/2006 | Sherburne | G06F 1/3203 713/500 |
| 2011/0249525 | A1 | 10/2011 | Haass et al. | |
| 2013/0179716 | A1 * | 7/2013 | Sistla | G06F 1/324 713/323 |
| 2014/0136737 | A1 | 5/2014 | Dreps et al. | |

(Continued)

OTHER PUBLICATIONS

International Search Report, PCT Application No. PCT/US2016/046871, dated completed Nov. 18, 2016, 3 pages.

*Primary Examiner* — Dac Ha
(74) *Attorney, Agent, or Firm* — International IP Law Group, P.L.L.C.

(57) ABSTRACT

Techniques for enabling a rapid clock frequency transition are described. An example of a computing device includes a Central Processing Unit (CPU) that includes a core and noncore components. The computing device also includes a dual mode FIFO that processes data transactions between the core and noncore components. The computing device also includes a frequency control unit that can instruct the core to transition to a new clock frequency. During the transition to the new clock frequency, the dual mode FIFO continues to process data transactions between the core and noncore components.

19 Claims, 4 Drawing Sheets

(56) References Cited

U.S. PATENT DOCUMENTS

2014/0325247 A1* 10/2014 Sodhi .................. G06F 1/26
                                                    713/320
2016/0092357 A1   3/2016 Rehana et al.
2016/0147249 A1*  5/2016 Gendler ................ G06F 1/10
                                                    713/501

* cited by examiner

400

CHANGING THE CLOCK FREQUENCY OF A COMPUTING DEVICE

TECHNICAL FIELD

This disclosure relates generally to techniques for adjusting the clock frequency of a computing device. More specifically, the disclosure describes techniques for implementing a fast clock frequency change in a computing device with multiple clock frequency domains.

BACKGROUND

High performance computing devices often include multiple devices operating in different clock domains, wherein the clock frequency of each clock is independently adjustable. A single processor may include multiple cores communicatively coupled to multiple noncore components, such as a memory controller, I/O interfaces, and others. Each core may operate in a separate clock domain, and the cores may operate in a separate clock domain from the noncore components. Interfaces have been developed for enabling effective communication between different clock domains.

The clock frequency operating within a specific clock domain can be adjusted for various reasons, such as to save power, for thermal protection, and others. In a typical throttling arrangement, the clock frequency of a core can be reduced to reduce the amount of generated heat. Changing the clock frequency tends to be a long process. This is due, in part, to the design of the phase-lock loop (PLL) used to generate the clock frequency and, in part, to the process for maintaining data integrity at the interface between the clock domains.

DETAILED DESCRIPTION

The subject matter disclosed herein relates to techniques for rapidly changing the clock frequency of a computing device. As explained above, changing the clock frequency tends to be a long process, on the order of 10 microseconds to 100 microseconds. For example, when a processor is throttled, first processor transactions are drained and the processor interface between the clock domains is blocked. The PLL associated with the processor is then stopped and restarted at the new frequency. When the PLL is stabilized, the processor interface can be unblocked and any blocked IP activity can be unblocked. The processor then resumes operation at the new frequency. During the transition between frequencies, the processor's communication with other clock domains is temporarily halted.

The present disclosure describes a technique that enables faster transition between frequencies. An example system includes a PLL referred to herein as a "banding PLL." As described further below, the banding PLL makes use of previously stored data that enables it to be stabilized more quickly, which increases the speed of the frequency transition. Furthermore, the processor interface between the clock domains is able to switch between different operating modes that enable it to continue transferring data during the frequency transition. The processor interface between the clock domains is a First-In-First-Out (FIFO) buffer referred to herein as a "dual mode FIFO." The dual mode FIFO, described further below, enables the frequency transition to occur without blocking the flow of data across the clock domains during the transition.

Using the techniques described herein a frequency change can be accomplished without the need to drain the processor, stop the clock, change the frequency, and re-start the clock again. To accomplish a frequency transition, first the dual mode FIFO is switched to asynchronous mode. When the dual mode FIFO is in asynchronous mode, the PLL can change frequency even if the PLL is not locked, the core can continue to operate, and the asynchronous interface can continue operate. Once the PLL re-acquires lock at the new frequency, the dual mode FIFO can switch back from asynchronous to synchronous.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Figure 1:
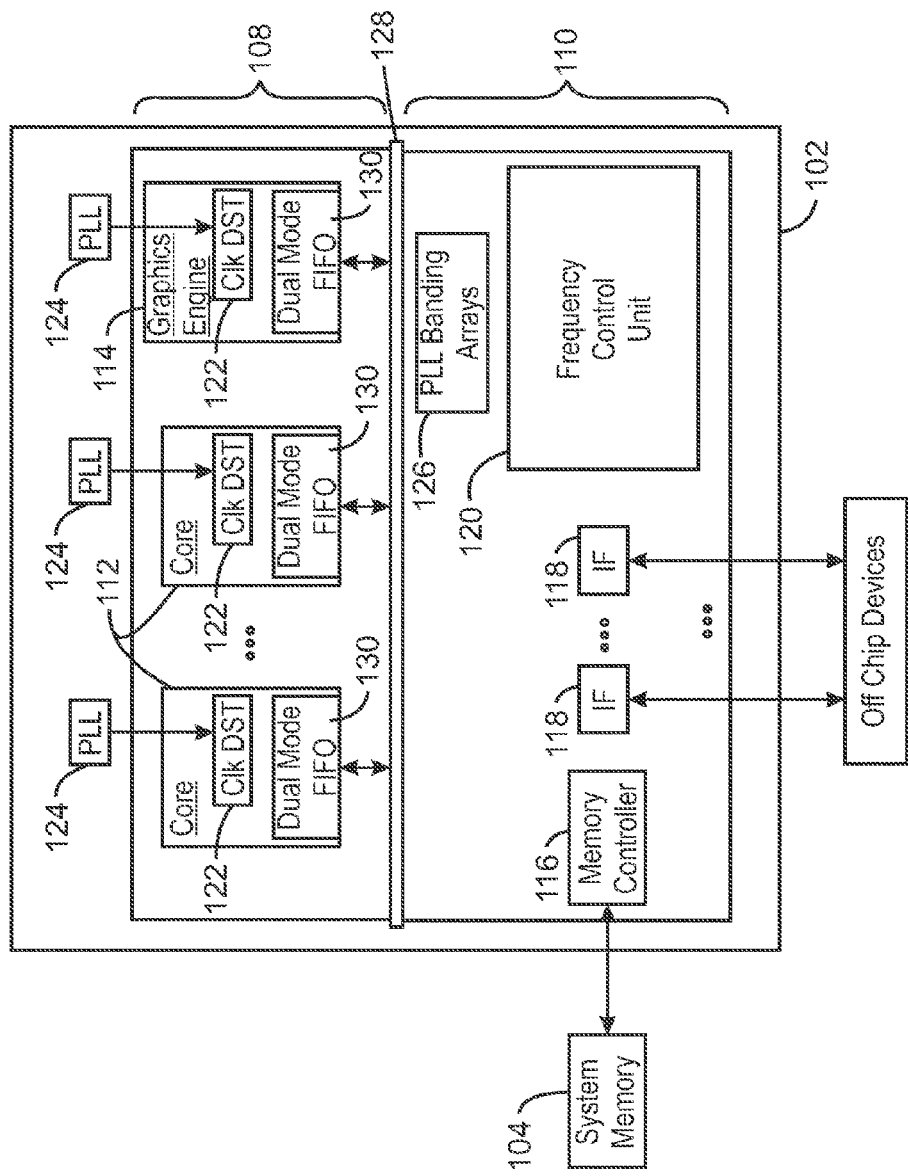
FIG. 1 is a block diagram of an example computing device that implements the rapid frequency change techniques described herein.

FIG. 1 is a block diagram of an example computing device that implements the rapid frequency change techniques described herein. The computing device 100 may be, for example, a mobile phone, laptop computer, ultrabook, desktop computer, server, or tablet computer, among others. The computing device 100 may include a multi-core Central Processing Unit (CPU) 102 that is adapted to execute stored instructions, and a system memory 104 that stores instructions that are executable by the CPU 102. Although only one CPU 102 is shown, the computing device 100 can include two or more CPUs 102. The CPU 102 may be implemented as Complex Instruction Set Computer (CISC) or Reduced Instruction Set Computer (RISC) processors, x86 Instruction set compatible processors, or any other microprocessor. In some embodiments, the CPU 102 is dual-core processor(s), dual-core mobile processor(s), or the like.

The memory device 104 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems. The memory device 104 can be used to store data and computer-readable instructions that, when executed by the processor, direct the processor to perform various operations in accordance with embodiments described herein. The computing device 100 may also include various off-chip devices 106, including storage devices such as disk drives, Network Interface Controllers, input/output (I/O) device interfaces for coupling external devices, and others.

The CPU 102 includes a core region 108 and a noncore region 110. The core region 108 includes the processor cores 112. The core region 108 can also include a graphics engine 114, which is a specialized processor that processes computer generated graphics to be rendered on a display of the computing device 100.

The noncore region 110 includes noncore components of the CPU 102, such as an integrated memory controller 116, which controls CPU access to the system memory 104, and interface units 118, which enable communication with the off-chip devices 106.

The noncore region 110 can also include a frequency control unit 120 that determines an appropriate operating frequency for the various units of the processor 102 including cores 112 and other units, based on configuration information, environmental information, operating parameter information, and others. For example, the frequency control unit 120 may determine that one or more cores 112 is operating above a threshold temperature. In response, the frequency control unit 120 can command the core to reduce its clock frequency, a process known as throttling. The frequency control unit 120 can also command the cores 112 to reduce their clock frequency in response to a switch to a new power mode (power savings), or increase the frequency such as in the turbo mode (when higher performance is required) mode. Within each core, the clock frequency may be referenced as a ratio of some base frequency. This ratio may also be referred to herein as the frequency ratio, clock frequency ratio, and the like.

Each core 112 also includes a clock distribution circuit 122, which receives an incoming clock signal from a phase lock loop (PLL) 124. Each core 112 receives a clock signal from its own dedicated PLL 124, which may be part of the noncore region of the processor 110. The operating frequency of each PLL 124 can be determined by the frequency control unit 120. The clock distribution circuit 122 is configured to receive the clock signal from the PLL 124 and distribute it to various functional blocks of the core 112. In some embodiments, clock distribution circuit 122 can reduce the effective operating frequency for distribution to certain functional unit blocks. In some embodiments, the clock distribution circuit 122 simply distributes the incoming clock signal to the functional blocks.

To enable the PLL 124 to lock onto the new frequency sooner, a banding process if performed in advance. The PLL 124 includes a digitally controlled oscillator (DCO) that has the ability to oscillate at a range of discrete frequency bands. The PLL 124 can also include a Post DCO divider (P DIV). The PDIV is used to allow the DCO to operate in the optimal frequency range, even if the required output frequency is low. In examples, the PDIV setting can be 1 (no dividing), 2, 4 or 8. As such, when the desired output frequency is 1600 MHz or higher, the PDIV setting is 1. When the desired output frequency is 800 MHz, for example, the DCO setting would be 1600 MHZ and PDIV setting would be 2. The acquisition of the correct frequency output of the PLL 124 depends, in part, on selecting the correct frequency band and the correct PDIV value to obtain a suitable output frequency, which can be further fine tuned. The selection of the frequency band of the DCO is referred to herein as coarse trimming, and the inputs to the DCO to select the frequency band are referred to herein as the coarse trimming values. In some examples, the DCO has 128 possible frequency bands that can be selected by a 7-bit input.

The banding process enables the coarse trimming values to be predetermined for each PLL in the computing device prior to a clock frequency change. The coarse trimming values can be determined for each frequency ratio at boot up and stored to an array, referred to as the PLL banding array 126. Upon a frequency change, the frequency ratio is used to look up the corresponding the coarse trimming value for that ratio in the PLL banding array 126. The coarse trimming values are then used as input to the DCO of the PLL 124. In this way, the PLL 124 is able to stabilize at the desired output frequency more quickly.

The core region 108 is communicatively coupled to components of the noncore region 110 via an interconnect 128. The interconnect 128 can also enable the cores 112 to communicate with each other and with the graphics engine 114. Each core 112, including the graphics engine 114, is coupled to the interconnect 128 via a dual mode FIFO 130. The dual mode FIFO 130 can operate in deterministic mode or asynchronous mode. The deterministic mode is when the relation of the clock frequencies on both sides of the dual mode FIFO 130 is known, both PLLs are locked, and there is one edge on each side that is aligned to one edge on the other side. In asynchronous mode, one PLL is not locked, the frequency and phase is changing, so there is no clear relation between the two clocks.

It is to be understood that the block diagram of FIG. 1 is not intended to indicate that the computing device 100 is to include all of the components shown in FIG. 1. Rather, the computing device 100 can include fewer or additional components not illustrated in FIG. 1. Techniques for operating the computing device 100 to accomplish a rapid frequency transition are discussed further below.

Figure 2:
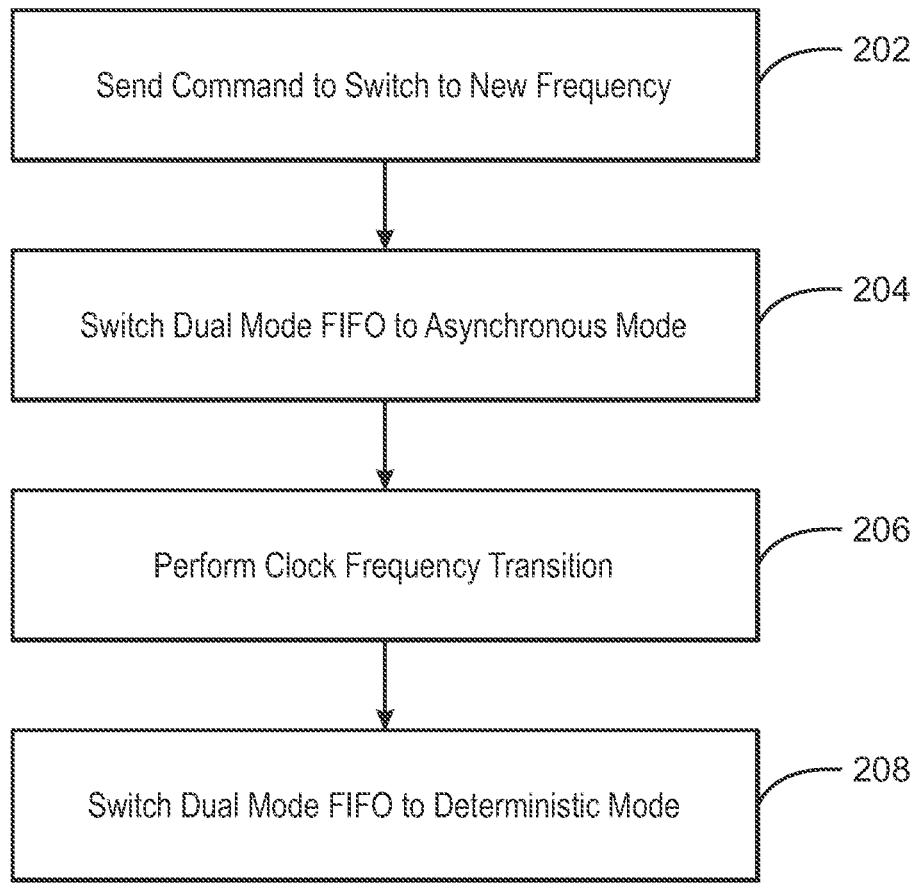
FIG. 2 is a simplified process flow diagram of an example method to accomplish a rapid frequency transition.

FIG. 2 is a simplified process flow diagram of an example method to accomplish a rapid frequency transition. The method 200 is described in relation to the components shown in FIG. 1 and may be performed by logic embodied in hardware, such as logic circuitry or one or more processors configured to execute instructions stored in a non-transitory, computer-readable medium.

At block 202, a command to switch to a new clock frequency is sent to and received by one of the cores 122. The command may be sent, for example, from the frequency control unit 120. In some examples, the desired clock frequency is communicated to the core in the form of a ratio above a base frequency. For example, if the base frequency is 100 MHz, a ratio of 16 would case the core to transition to a clock frequency of 1600 MHz.

At block 204, the core 122 causes the dual mode FIFO 130 to switch from deterministic mode to asynchronous mode. Asynchronous mode enables the core to communicate with other components that may not be operating at the same clock frequency, or when the two domains are at the same frequency, but the clock edges are not aligned in the two blocks since one PLL is still acquiring lock. This enables the dual mode FIFO 130 to continue processing transactions during the clock frequency transition.

At block 206, the clock frequency transition is performed. During the clock frequency transition, the ratio is used to look up the coarse trimming values for the PLL's oscillator. The coarse trimming values are input to the PLL 124 and the PLL 124 is allowed to stabilize at the desired output frequency. A fine trimming process may also be performed to stabilize the output frequency to account for jitter, temperature drift, and other factors. After the output frequency of the PLL 124 stabilizes at the desired frequency and the PLL acquires lock, the process flow advances to block 208.

At block 208, the dual mode FIFO 130 is switched back to deterministic mode.

The method 200 should not be interpreted as meaning that the blocks are necessarily performed in the order shown. Furthermore, fewer or greater actions can be included in the method 200 depending on the design considerations of a particular implementation. Additionally, the method 200 may be performed for several or all of the cores 112 in parallel. More detailed process flows are described in relation to FIGS. 4 and 5.

Figure 3:
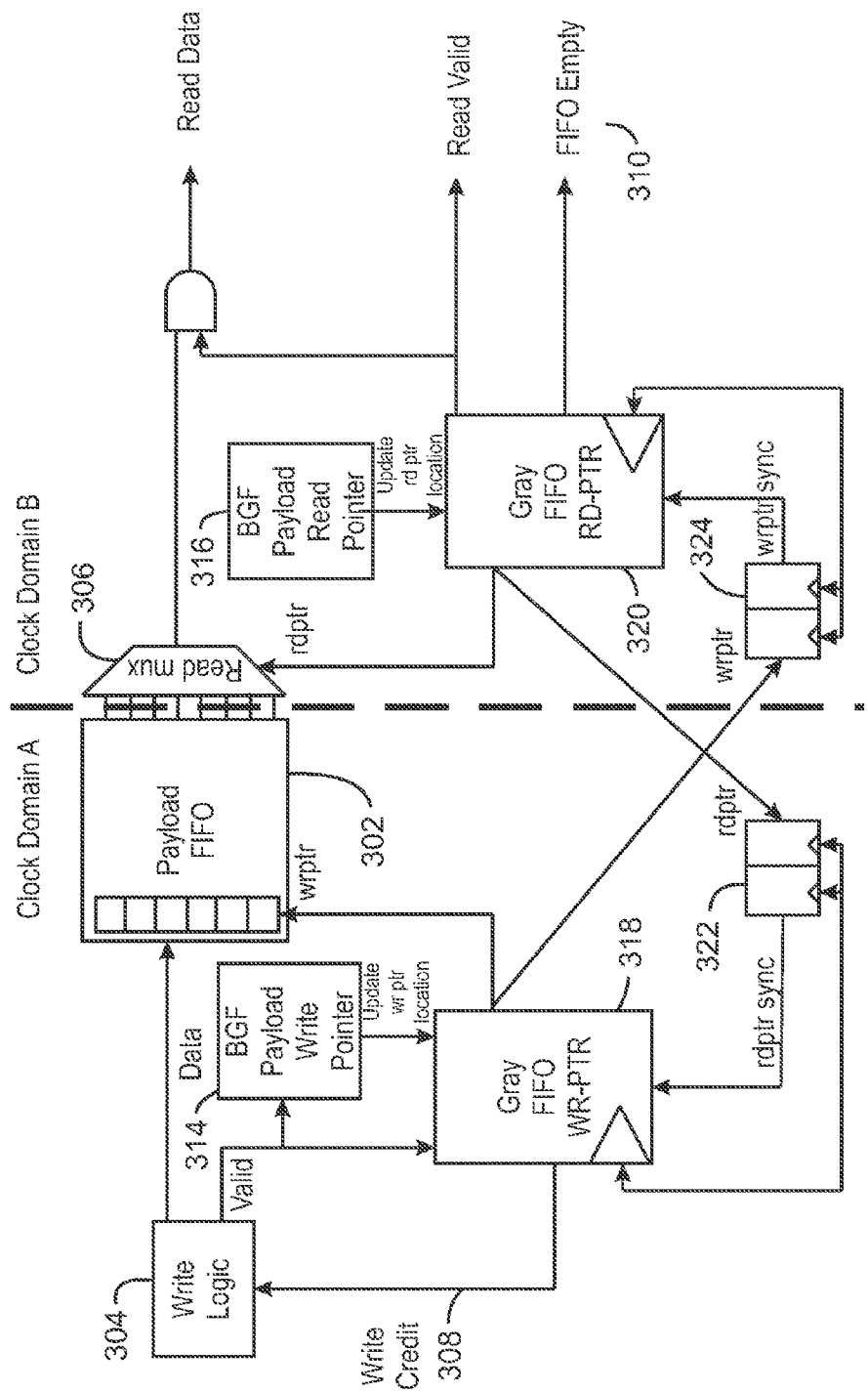
FIG. 3 is a block diagram of a dual mode FIFO used to enable rapid frequency transitions.

FIG. 3 is a block diagram of a dual mode FIFO used to enable rapid frequency transitions. The dual mode FIFO 130 includes a payload FIFO 302 that operates in both clock domains. Data is written to the payload FIFO 302 by the write logic 304 at clock domain A and read out of the payload FIFO 302 by the read multiplexer 306 at clock domain B. Data is written to the payload FIFO 302 at the clock frequency operating in clock domain A and written out of the payload FIFO 302 at the clock frequency operating in clock domain B. A write pointer is used on clock domain A to determine the FIFO register at which to write incoming data, and a read pointer is used in clock domain B to determine the FIFO register at which to read data.

In deterministic mode, the clock frequencies of clock domain A and clock domain B are both stable and not changing, and the dual mode FIFO 130 operates as a type of FIFO known as a "bubble generator FIFO" (BGF). During deterministic mode, the dual mode FIFO 130 operates as a synchronizer between the two clock domains, which may be operating at different frequencies. Even if the clock domains are at the same frequency, effects such as with clock skew and jitter, caused by different voltage and PLL characteristics of the different domains, can cause clock timing variations across the two domains. A bubble generator FIFO rolls up all of the skew and jitter from multiple sources into one combined "slip" budget between the clock domains.

The dual mode FIFO 130 includes BGF write logic 314, BGF read logic 316, Gray FIFO write logic 318, and Gray FIFO read logic 320. During deterministic mode, the write pointers and read pointers are generated by the BGF write logic 314 and BGF read logic 316, respectively. The write logic and read logic are enabled to write or read by a Time Slot Valid signal. This maintains the correct distance between the two pointers to avoid meta-stability issues which can occur when data is moved between 2 different clock domains.

During asynchronous mode, the write pointers and read pointers generated by the BGF write logic 314 are sent the Gray FIFO write logic 318 and Gray FIFO read logic 320, respectively, and converted to Gray code pointers which can be moved to the other clock domain asynchronously.

In asynchronous mode, the dual mode FIFO 130 operates as a FIFO known as a gray FIFO. The Gray FIFO write logic 318 converts the write pointer to a gray code pointer, which is then used for the write pointer to the payload FIFO 302. The Gray FIFO read logic 320 converts the read pointer to a gray code pointer, which is then used for the read pointer to the payload FIFO 302. For the pointer comparisons, the Gray FIFO write logic 318 and Gray FIFO read logic 320 communicate their pointers to one another through a pair of synchronizer modules 322 and 324. Each synchronizer module may be a two flip-flop synchronizer. During each FIFO transaction, the write pointer and the read pointer are compared to determine whether the FIFO is empty or full. In some examples, if the FIFO is full, a FIFO full signal is generated to cause the write logic to stop writing data, and if the FIFO is empty, a FIFO empty signal is generated to cause the read logic to stop reading data from the payload FIFO 302. In the example shown in FIG. 3, the write logic is assigned a specified number of write credits, such that if the write logic runs out of write credits, the write logic to stop writing data to the payload FIFO 302. Each time an entry is read, a write credit 308 is sent to the write logic 304.

The dual mode FIFO 130 can receive a request to transition to asynchronous mode from the frequency control unit 120 (FIG. 1). In response, the dual mode FIFO 130 copies current read and write pointers to the Gray FIFO logic and enables Gray FIFO control. When the dual mode FIFO 130 receives a request to transition to back to deterministic mode from the frequency control unit 120 (FIG. 1), the dual mode FIFO freezes the Gray FIFO write logic 318. The BGF write logic 314 then starts operating and accumulates new writes. At this time, the Gray FIFO write pointer is not active, but the read side continues to read, which will cause to Gray FIFO read logic 320 to eventually achieve an empty state. Meanwhile, the BGF read pointer is stalled and waits for the Gray FIFO side to become idle. When the Gray FIFO becomes idle, the BGF read pointer is activated and the dual mode FIFO 130 will begin operating in deterministic mode.

Figure 4:
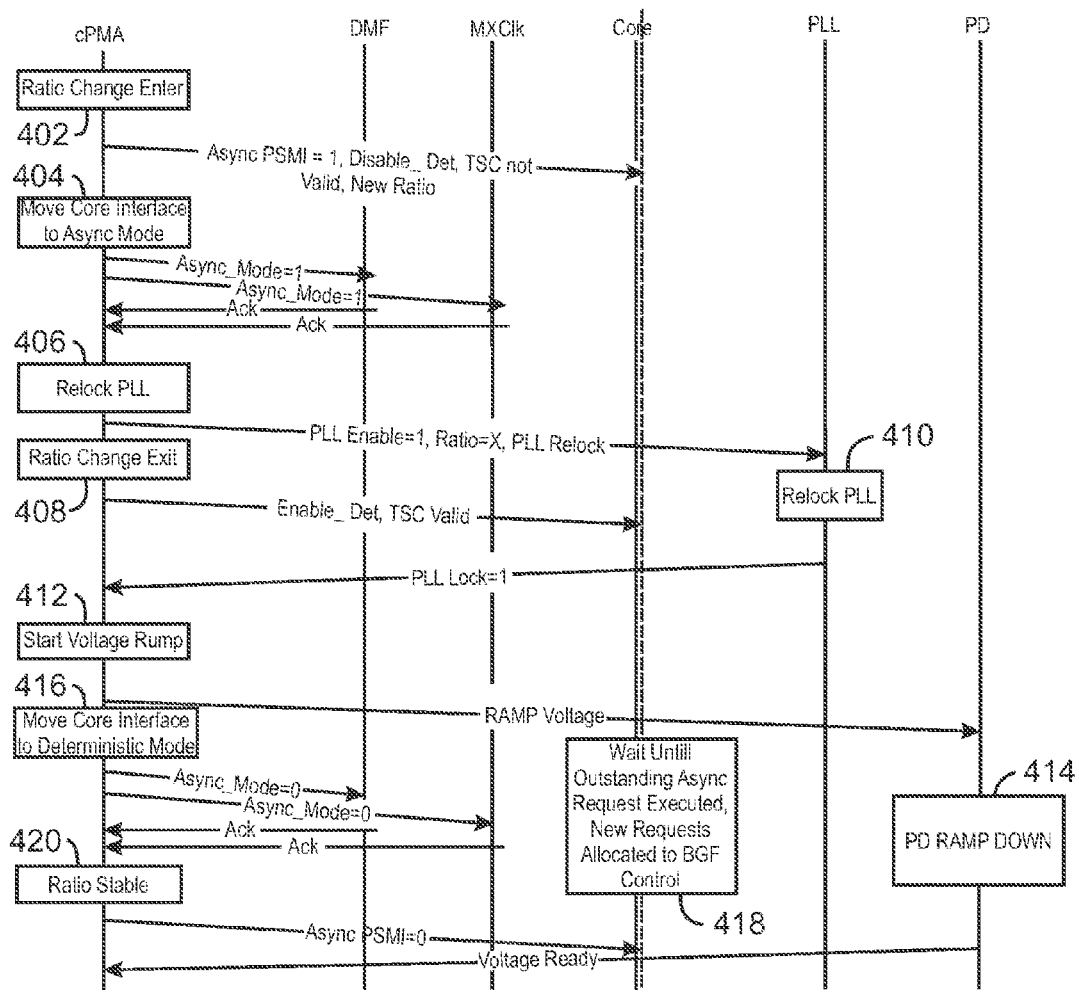
FIG. 4 is a timing diagram of a method of performing a fast frequency change.

FIG. 4 is a timing diagram of a method of performing a fast frequency change. The timing diagram shows the communication between the core Power Management Agent (cPMA), the dual mode FIFO (DMF), the MxClk, the core, the PLL, and the Power Delivery (PD) components. MxClk is a clock signal generated from a core clock, which is running at some base frequency, for example, 100 MHz.

At block 402, the cPMA triggers a clock frequency change by sending a message to change the clock frequency to the core. As shown in FIG. 4, the message can include a Time Stamp Counter (TSC) not valid flag. This temporarily prevents the core from relying on the time stamp counter to provide accurate timing information. The message also includes the new clock frequency ratio. The message also instructs the core's Periodic System Management Interrupt (PSMI) to transition to asynchronous mode. The PSMI is a component of the core that enables the core to record all noncore to core transactions and the time of arrival at the core. The message can also include a Disable_Det flag, which causes the core to disable any logical blocks or functions that require determinism to function properly.

At block 404, after acknowledge from the core, the dual mode FIFO is transitioned to Asynchronous mode. As show in FIG. 4, messages are then sent from the cPMA instructing the dual mode FIFO and the MxClk to transition to asynchronous mode. After acknowledgements are received from both, the process advances to block 406.

At block 406, the process of relocking the core's PLL at the new frequency is initiated. To do this, the new ratio is sent to the PLL and enabled to transition to the new frequency.

At block 408, the ratio change process is exited. At this time, an Enable_Det flag is sent to the core, which causes the core to re-enable any logical blocks or functions that require determinism to function properly and were previously disabled after block 402. The cPMA also sends a TSC Valid flag to the core, informing the core that the TSC is now valid.

At block 410, the PLL performs the process described above for transitioning to the new clock frequency. As described above, the ratio is used to look up the coarse trimming values for the particular PLL. When the PLL is locked to the new frequency, the PLL sends a lock indicator to the cPMA. After receiving the PLL lock indicator from the PLL, the process flow advances to block 412.

At block 412, the cPMA informs the PD component to start a voltage ramp, to reduce the voltage supplied to the core to a level suitable for the lower clock frequency. When changing to a higher frequency, the voltage increase is enabled first, and when the voltage is stable at the new value, the PLL can change to the higher frequency. In both cases, the frequency change occurs at the higher voltage.

At block 414, the PD component performs the voltage ramp and reduces the voltage applied to the core. When the voltage ramp is complete, the PD component sends a voltage ready message back to the cPMA.

At block 416, the cPMA moves the core to back to deterministic mode. As show in FIG. 4, messages are then sent from the cPMA instructing the dual mode FIFO and the MxClk to transition to deterministic mode.

At block 418, the core waits until any outstanding asynchronous transactions are completed while new transactions are allocated to control of the BGF logic. After acknowledgements are received from the dual mode FIFO and the MxClk indicating that the transition to deterministic mode is complete, the process advances to block 420.

At block 420, the cPMA indicates that the new clock frequency is stable. The cPMA sends a message to the core to return the PSMI to synchronous mode.

EXAMPLES

Example 1 is a computing device to perform rapid clock frequency transitions. The computing device includes a Central Processing Unit (CPU) comprising a core and noncore components; a dual mode FIFO to process data transactions between the core and noncore components; and a frequency control unit to instruct the core to transition to a new clock frequency, wherein during the transition, the dual mode FIFO continues to process data transactions between the core and noncore components.

Example 2 includes the computing device of example 1, including or excluding optional features. In this example, during the transition to the new clock frequency, the dual mode FIFO switches from deterministic mode to asynchronous mode. Optionally, the dual mode FIFO comprises a gray code logic for processing transactions during asynchronous mode. Optionally, the dual mode FIFO comprises a bubble generator logic for processing transactions during deterministic mode.

Example 3 includes the computing device of any one of examples 1 to 2, including or excluding optional features. In this example, the computing device includes a Phase Locked Loop (PLL) that generates the clock frequency of the core. Optionally, the computing device includes a banding array that stores pre-determined coarse trimming values of the PLL for a plurality of potential clock frequencies, wherein a corresponding coarse trimming value is acquired from the banding array to enable the transition to the new clock frequency. Optionally, the coarse trimming values are acquired and stored during a boot up of the computing device. Optionally, after the PLL re-acquires lock at the new clock frequency, the dual mode FIFO switches from asynchronous mode to deterministic mode.

Example 4 includes the computing device of any one of examples 1 to 3, including or excluding optional features. In this example, the core is prevented from relying on a time stamp counter of the core to provide accurate timing information during the transition to the new clock frequency.

Example 5 includes the computing device of any one of examples 1 to 4, including or excluding optional features. In this example, during the transition to the new clock frequency, the core is to disable any logical blocks of the core that require determinism to function properly.

Example 6 is a method of switching a processor core to a new clock frequency. The method includes sending a command to the core to initiate a transition to a new clock frequency; switching a dual mode FIFO of the core from deterministic mode to asynchronous mode, the dual mode FIFO to process data transactions between the core and noncore components during the transition to the new clock frequency; performing the transition to the new clock frequency; and switching the dual mode FIFO from asynchronous mode back to deterministic mode.

Example 7 includes the method of example 6, including or excluding optional features. In this example, switching the dual mode FIFO from deterministic mode to asynchronous mode comprises enabling a gray code logic for processing transactions during asynchronous mode.

Example 8 includes the method of any one of examples 6 to 7, including or excluding optional features. In this example, switching the dual mode FIFO from asynchronous mode to deterministic mode comprises disabling a gray code logic for processing transactions during asynchronous mode, and enabling a bubble generator logic for processing transactions during deterministic mode.

Example 9 includes the method of any one of examples 6 to 8, including or excluding optional features. In this example, the new frequency is referenced by the core as a ratio of a base frequency.

Example 10 includes the method of any one of examples 6 to 9, including or excluding optional features. In this example, performing the transition to the new clock frequency comprises looking up a coarse trimming value for a PLL of the core using the new clock frequency. Optionally, the coarse trimming value is obtained from a banding array that stores a plurality of predetermined coarse trimming values, each predetermined coarse trimming value corresponding to a potential clock frequency setting of the core. Optionally, the plurality of predetermined coarse trimming values are acquired and stored during a boot up of a computing device comprising the processor core.

Example 11 includes the method of any one of examples 6 to 10, including or excluding optional features. In this example, the method includes switching the dual mode FIFO from asynchronous mode to deterministic mode after the PLL re-acquires lock at the new clock frequency.

Example 12 includes the method of any one of examples 6 to 11, including or excluding optional features. In this example, the method includes preventing the core from relying on the time stamp counter of the core to provide accurate timing information during the transition to the new clock frequency.

Example 13 includes the method of any one of examples 6 to 12, including or excluding optional features. In this example, the method includes during the transition to the new clock frequency, disabling any logical blocks of the core that require determinism to function properly.

Example 14 is a computing device to perform rapid clock frequency transitions. The computing device includes a Central Processing Unit (CPU) comprising a core and noncore components; a Phase Locked Loop (PLL) to generate a clock frequency of the core; a dual mode FIFO to process data transactions between the core and noncore components; a frequency control unit to instruct the core to transition to a new clock frequency, the frequency control unit to: send a command to the core to initiate the transition to the new clock frequency; switch the dual mode FIFO from deterministic mode to asynchronous mode; and command the PLL to transition to the new clock frequency.

Example 15 includes the computing device of example 14, including or excluding optional features. In this example, the dual mode FIFO comprises a gray code logic for processing transactions during asynchronous mode, and a bubble generator logic for processing transactions during deterministic mode. Optionally, to switch the dual mode FIFO from asynchronous mode to deterministic mode, the dual mode FIFO disables the gray code logic and enables the bubble generator logic. Optionally, the dual mode FIFO is to disable the bubble generator logic and enable the gray code logic to switch the dual mode FIFO from deterministic mode to asynchronous mode.

Example 16 includes the computing device of any one of examples 14 to 15, including or excluding optional features. In this example, a banding process is to be performed to obtain coarse trimming values for the PLL for each potential setting of the clock frequency, the coarse trimming values to be stored to a banding array. Optionally, to perform the transition to the new clock frequency, the PLL acquires a coarse trimming value corresponding to the new clock frequency from the banding array. Optionally, the coarse trimming values are acquired and stored during a boot up of the computing device.

Example 17 includes the computing device of any one of examples 14 to 16, including or excluding optional features. In this example, the frequency control unit is to instruct the dual mode FIFO to switch from asynchronous mode to deterministic mode after the PLL re-acquires lock at the new clock frequency.

Example 18 includes the computing device of any one of examples 14 to 17, including or excluding optional features. In this example, the frequency control unit is to send a Time Stamp Counter (TSC) not valid flag to the core to prevent the core from relying on the time stamp counter to provide accurate timing information during the during the transition to the new clock frequency.

Example 19 includes the computing device of any one of examples 14 to 18, including or excluding optional features. In this example, the frequency control unit is to instruct the core is to disable any logical blocks of the core that require determinism to function properly during the transition to the new clock frequency.

Example 20 is an apparatus to rapidly transition to a new clock frequency. The apparatus includes means for sending a command to the core to initiate a transition to a new clock frequency; means for switching a dual mode FIFO of the core from deterministic mode to asynchronous mode, the dual mode FIFO to process data transactions between the core and noncore components during the transition to the new clock frequency; means for performing the transition to the new clock frequency; and means for switching the dual mode FIFO from asynchronous mode back to deterministic mode.

Example 21 includes the apparatus of example 20, including or excluding optional features. In this example, the means for switching the dual mode FIFO from deterministic mode to asynchronous mode comprises means for enabling a gray code logic for processing transactions during asynchronous mode.

Example 22 includes the apparatus of any one of examples 20 to 21, including or excluding optional features. In this example, the means for switching the dual mode FIFO from asynchronous mode to deterministic mode comprises means for disabling a gray code logic for processing transactions during asynchronous mode, and enabling a bubble generator logic for processing transactions during deterministic mode.

Example 23 includes the apparatus of any one of examples 20 to 22, including or excluding optional features. In this example, the new frequency is referenced by the core as a ratio of a base frequency.

Example 24 includes the apparatus of any one of examples 20 to 23, including or excluding optional features.

In this example, the means for performing the transition to the new clock frequency comprises means for looking up a coarse trimming value for a PLL of the core using the new clock frequency. Optionally, the apparatus includes means for obtaining the coarse trimming value from a banding array that stores a plurality of predetermined coarse trimming values, each predetermined coarse trimming value corresponding to a potential clock frequency setting of the core. Optionally, the apparatus includes means for acquiring and storing the plurality of predetermined coarse trimming values during a boot up of a computing device comprising the processor core.

Example 25 includes the apparatus of any one of examples 20 to 24, including or excluding optional features. In this example, the apparatus includes means for switching the dual mode FIFO from asynchronous mode to deterministic mode after the PLL re-acquires lock at the new clock frequency.

Example 26 includes the apparatus of any one of examples 20 to 25, including or excluding optional features. In this example, the apparatus includes means for preventing the core from relying on the time stamp counter of the core to provide accurate timing information during the transition to the new clock frequency.

Example 27 includes the apparatus of any one of examples 20 to 26, including or excluding optional features. In this example, the apparatus includes means for disabling, during the transition to the new clock frequency, any logical blocks of the core that require determinism to function properly.

Example 28 is a tangible, non-transitory, computer-readable medium comprising instructions that, when executed by a processor, direct the processor to perform a rapid frequency transition. The computer-readable medium includes instructions that direct the processor to send a command to a core of a Central Processing Unit (CPU) to initiate a transition to a new clock frequency, wherein the CPU comprises noncore components; send a command to the core to switch a dual mode FIFO of the core from deterministic mode to asynchronous mode, the dual mode FIFO to process data transactions between the core and the noncore components; and send a command to a Phase Locked Loop (PLL) coupled to the core to command the PLL to transition to the new clock frequency.

Example 29 includes the computer-readable medium of example 28, including or excluding optional features. In this example, the dual mode FIFO comprises a gray code logic for processing transactions during asynchronous mode, and a bubble generator logic for processing transactions during deterministic mode. Optionally, to switch the dual mode FIFO from asynchronous mode to deterministic mode, the dual mode FIFO disables the gray code logic and enables the bubble generator logic. Optionally, the dual mode FIFO is to disable the bubble generator logic and enable the gray code logic to switch the dual mode FIFO from deterministic mode to asynchronous mode.

Example 30 includes the computer-readable medium of any one of examples 28 to 29, including or excluding optional features. In this example, the instructions are to direct the processor to perform a banding process to obtain coarse trimming values for the PLL for each potential setting of the clock frequency. Optionally, to perform the transition to the new clock frequency, the instructions are to direct the processor to acquire a coarse trimming value corresponding to the new clock frequency from the banding array. Optionally, the coarse trimming values are acquired and stored during a boot up of the computing device.

Example 31 includes the computer-readable medium of any one of examples 28 to 30, including or excluding optional features. In this example, the instructions are to direct the processor to instruct the dual mode FIFO to switch from asynchronous mode to deterministic mode after the PLL re-acquires lock at the new clock frequency.

Example 32 includes the computer-readable medium of any one of examples 28 to 31, including or excluding optional features. In this example, the instructions are to direct the processor to send a Time Stamp Counter (TSC) not valid flag to the core to prevent the core from relying on the time stamp counter to provide accurate timing information during the during the transition to the new clock frequency.

Example 33 includes the computer-readable medium of any one of examples 28 to 32, including or excluding optional features. In this example, the instructions are to direct the processor instruct the core is to disable any logical blocks of the core that require determinism to function properly during the transition to the new clock frequency.

Some embodiments may be implemented in one or a combination of hardware, firmware, and software. Some embodiments may also be implemented as instructions stored on the tangible non-transitory machine-readable medium, which may be read and executed by a computing platform to perform the operations described. In addition, a machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A computing device comprising:
    a Central Processing Unit (CPU) comprising a core and noncore components;
    a dual mode First-In-First-Out (FIFO) to process data transactions between the core and noncore components; and
    a frequency control unit to instruct the core to transition to a new clock frequency, wherein during the transition, the dual mode FIFO is to switch from deterministic mode to asynchronous mode and continue to process data transactions between the core and noncore components.

2. The computing device of claim 1, wherein the dual mode FIFO comprises a gray code logic for processing transactions during asynchronous mode.

3. The computing device of claim 1, wherein the dual mode FIFO comprises a bubble generator logic for processing transactions during deterministic mode.

4. The computing device of claim 1, comprising a Phase Locked Loop (PLL) that generates the clock frequency of the core.

5. The computing device of claim 4, comprising a banding array that stores pre-determined coarse trimming values of the PLL for a plurality of potential clock frequencies, wherein a corresponding coarse trimming value is acquired from the banding array to enable the transition to the new clock frequency.

6. The computing device of claim 5, wherein the coarse trimming values are acquired and stored during a boot up of the computing device.

7. A method of switching a processor core to a new clock frequency, comprising:
    sending a command to the core to initiate a transition to a new clock frequency;
    switching a dual mode First-In-First-Out (FIFO) of the core from deterministic mode to asynchronous mode, the dual mode FIFO to process data transactions between the core and noncore components during the transition to the new clock frequency;
    performing the transition to the new clock frequency; and
    switching the dual mode FIFO from asynchronous mode back to deterministic mode.

8. The method of claim 7, wherein switching the dual mode FIFO from deterministic mode to asynchronous mode comprises enabling a gray code logic for processing transactions during asynchronous mode.

9. The method of claim 7, wherein switching the dual mode FIFO from asynchronous mode to deterministic mode comprises disabling a gray code logic for processing transactions during asynchronous mode, and enabling a bubble generator logic for processing transactions during deterministic mode.

10. The method of claim 7, wherein the new frequency is referenced by the core as a ratio of a base frequency.

11. The method of claim 7, wherein performing the transition to the new clock frequency comprises looking up a coarse trimming value for a PLL of the core using the new clock frequency.

12. The method of claim 11, wherein the coarse trimming value is obtained from a banding array that stores a plurality of predetermined coarse trimming values, each predetermined coarse trimming value corresponding to a potential clock frequency setting of the core.

13. The method of claim 11, wherein the plurality of predetermined coarse trimming values are acquired and stored during a boot up of the computing device.

14. A computing device comprising:
a Central Processing Unit (CPU) comprising a core and noncore components;
a Phase Locked Loop (PLL) to generate a clock frequency of the core;
a dual mode First-In-First-Out (FIFO) to process data transactions between the core and noncore components;
a frequency control unit to instruct the core to transition to a new clock frequency, the frequency control unit to:
send a command to the core to initiate the transition to the new clock frequency;
switch the dual mode FIFO from deterministic mode to asynchronous mode; and
command the PLL to transition to the new clock frequency.

15. The computing device of claim 14, wherein the dual mode FIFO comprises a gray code logic for processing transactions during asynchronous mode, and a bubble generator logic for processing transactions during deterministic mode.

16. The computing device of claim 15, wherein to switch the dual mode FIFO from asynchronous mode to deterministic mode, the dual mode FIFO disables the gray code logic and enables the bubble generator logic.

17. The computing device of claim 15, wherein the dual mode FIFO is to disable the bubble generator logic and enable the gray code logic to switch the dual mode FIFO from deterministic mode to asynchronous mode.

18. The computing device of claim 15, wherein at boot up of the computing device, a banding process is to be performed to obtain coarse trimming values for the PLL for each potential setting of the clock frequency, the coarse trimming values to be stored to a banding array.

19. The computing device of claim 18, wherein to perform the transition to the new clock frequency, the PLL acquires a coarse trimming value corresponding to the new clock frequency from the banding array.

* * * * *